UNITED STATES PATENT OFFICE.

CHARLES B. JACOBS, OF PORT CHESTER, NEW YORK, ASSIGNOR OF ONE-HALF TO HEBER R. BISHOP, OF NEW YORK, N. Y.

PROCESS OF MAKING BARIUM OXID.

No. 886,607.   Specification of Letters Patent.   Patented May 5, 1908.

Application filed December 1, 1905.   Serial No. 289,850.   (Specimens.)

*To all whom it may concern:*

Be it known that I, CHARLES B. JACOBS, a citizen of the United States, residing at Port Chester, county of Westchester, and State of New York, have invented certain new and useful Improvements in Processes of Making Barium Oxid; and in order that those skilled in the art may understand and practice my invention I give the following specification.

My invention relates to the production of barium oxid from barium carbonate and has for its object to accomplish this in a practical manner, so that the production of barium oxid may be performed upon a commercial scale.

I am aware that processes by which barium oxid may be obtained from barium carbonate have heretofore been described in text-books and other technical publications,—for instance, the preparation of barium oxid by heating barium carbonate mixed with lamp black, charcoal or other carbonaceous material to a white heat. But such processes are merely of laboratory interest and not practicable for commercial use. In spite of these processes being known, there exists to-day, so far as I can learn, no commercially practicable process for the production of barium oxid. This is accounted for by the fact that, even at the highest heat of a forge fire, the $CO_2$ remains combined with the barium oxid, the formation of the oxid being superficial and the interior of the particles or fragments of the ore remaining unreduced, and this is true even at the high temperature obtainable in the electric furnace. This is accounted for by the fact that the $CO_2$ evolved in endeavoring to escape from the interior of the particles or fragments of the carbonate finds no ready means of exit and recombines with the oxid formed thus reforming the carbonate. This is particularly the case when heat alone is employed. At the temperature employed, the particles or fragments of carbonate become superficially fused and this fused exterior further obstructs or prevents the escape of the $CO_2$. The amount of barium oxid which is found in the product produced in this manner is too small to be of any commercial value. Where carbon is mixed with the charge, as described in text-books (viz. Roscoe & Schorlemmer, page 456; Thorpe, page 282; Watts, page 413 and Bloxam, page 328) in the proportions of 1/10 to 1/12 of its weight, the amount of barium oxid obtained is also commercially insignificant for the reason that the density of the charge is so great that the $CO_2$ liberated cannot come into contact with the carbon to a sufficient extent to convert it into carbon monoxid. Furthermore, the temperature required to carry out the reaction proposed is so high that it is practically and technically impossible to find materials suitable for the retorts. Only earthenware or fire-clay retorts will stand the temperature necessary for the reaction, which is much beyond that at which iron retorts can be used. Where clay retorts are employed, the temperature is so high as to cause a combination of the barium compound with the materials forming the retorts, with the formation of silicates, thus not only fluxing the retorts and destroying them, but at the same time using up the barium compound to no purpose so far as the yield of barium oxid is concerned. This difficulty has been appreciated and it has been proposed to line the retorts with charcoal. While this is feasible for laboratory and test experiments, it is quite impracticable for actual commercial work.

I have discovered that practical and commercial production of barium oxid from barium carbonate may be carried on where proper conditions are established. Among these conditions are free exit for the $CO_2$ liberated, the protection of the barium oxid therefrom and the protection of the barium compounds from the retorts. My invention enables these conditions to be secured in a ready, simple and efficient manner, and a further advantage is obtained in that the $CO_2$ liberated is decomposed in the reaction mass. Thus the reformation of the carbonate is effectually prevented, and as a result of my invention, from 90 to 95 % of carbonate is converted into oxid.

In carrying out my invention I suspend the barium carbonate to be treated in a porous mass of carbon so that the carbonate is disseminated throughout the mass as particles (of greater or less degree of fineness) each particle being surrounded and enveloped by carbon—the carbon being in excess of that theoretically required to convert the $CO_2$ to CO. Under these conditions the gases liberated in the reaction have free exit from the mass; each particle of barium oxid formed is surrounded by porous carbon incandescent at the temperature of the reaction, which effectually protects it from the $CO_2$, and the barium compounds, being embedded in the porous mass are kept from contact with the retorts.

As illustrating my invention, the following specific example is given: 40 parts, by weight, of barium carbonate are intimately mixed with 16 parts by weight of coking coal and the mixture is subjected to preliminary heating, that is, to heating to a temperature below that required to convert the barium carbonate into barium oxid. In this preliminary step the mass or charge swells up into a porous mass of coke, and each particle of barium carbonate becomes surrounded by an envelop of coke or fixed carbon. The particles of barium carbonate are thus carried in suspension in the cell walls of the porous mass of carbon. The coal employed should be of a variety of coking coal running approximately not less than 20% to 25% of volatile carbon. After the coal has been converted into coke and the proper protective porous mass obtained, the temperature is raised to a full red heat verging to a white heat, when the reduction or dissociation of the barium carbonate into barium oxid takes place. The $CO_2$ finds ready exit through the pores of the carbon mass which is heated to incandescence. In passing through, the $CO_2$ is converted to $CO$, which is without action on the barium oxid. Each particle of barium oxid is protected from the $CO_2$ by its envelop of incandescent carbon.

The reactions involved are as follows:

(1) $BaCO_3 = BaO + CO_2$
(2) $CO_2 + C = 2CO$ which take place practically simultaneously.

Practically complete reduction of the barium carbonate is obtained by my invention, since each particle of the barium carbonate when it reaches the subsequent reacting temperature is surrounded by a protective envelop of porous carbon which prevents access of the $CO_2$ liberated to the barium oxid. The $CO_2$ immediately comes into contact with an excess of incandescent carbon and is converted into $CO$ and rendered harmless. No $CO_2$ can reach the particles of barium oxid formed, since in order to do so it must pass through the protecting envelop of incandescent carbon. Fluxing of the retorts is prevented from the fact that the barium compound does not come into contact with the walls of the retort and the retorts may therefore be used over and over again without deterioration, except such as would naturally follow from wear and tear in the mechanical charging, discharging and firing. After the reaction is complete, the porous mass is cooled and treated in any manner suitable or convenient for the recovery of the barium oxid, as for instance, by lixiviation with water, its porous condition materially favoring the extraction of barium oxid.

Having set forth my invention, what I claim and desire to protect by Letters Patent is:

1. The process of reducing barium carbonate to barium oxid, which consists in suspending the carbonate in a finely divided condition in and throughout a uniformly porous reducing agent, and subjecting the same to heat to liberate the carbon dioxid whereby the carbon dioxid is reduced to carbon monoxid and ready exit provided for the escape of the gas.

2. The process of converting barium carbonate into barium oxid, which consists in suspending the carbonate in the form of fine particles throughout a uniformly porous mass of carbon, subjecting said mass to heat to decompose the barium carbonate.

3. The process of converting barium carbonate into barium oxid, which consists in mixing the carbonate with coking coal, coking the mixture and then heating the mass to a temperature sufficient to decompose the carbonate.

4. The process of converting barium carbonate into barium oxid, which consists in intimately mixing 40 parts by weight of said carbonate with 16 parts by weight of coking coal then heating the mixture to decompose the carbonate.

5. The process of converting barium carbonate into barium oxid, which consists in mechanically suspending the carbonate in the form of particles throughout a mass of porous carbon whereby the carbon forms a mechanical carrier for the carbonate, the carbon being in excess of the amount theoretically required to reduce the carbon dioxid raising the mass to a temperature sufficient to decompose the carbonate whereby the particles of carbonate are converted into barium oxid and each particle is surrounded by a protective envelop of incandescent carbon.

CHARLES B. JACOBS.

Witnesses:
WILLIAM P. HAMMOND,
H. C. WORKMAN.